F. A. RAYMOND.
AUTOMOBILE WRECKING TRUCK.
APPLICATION FILED AUG. 15, 1916.
1,300,649.
Patented Apr. 15, 1919.
3 SHEETS—SHEET 1.
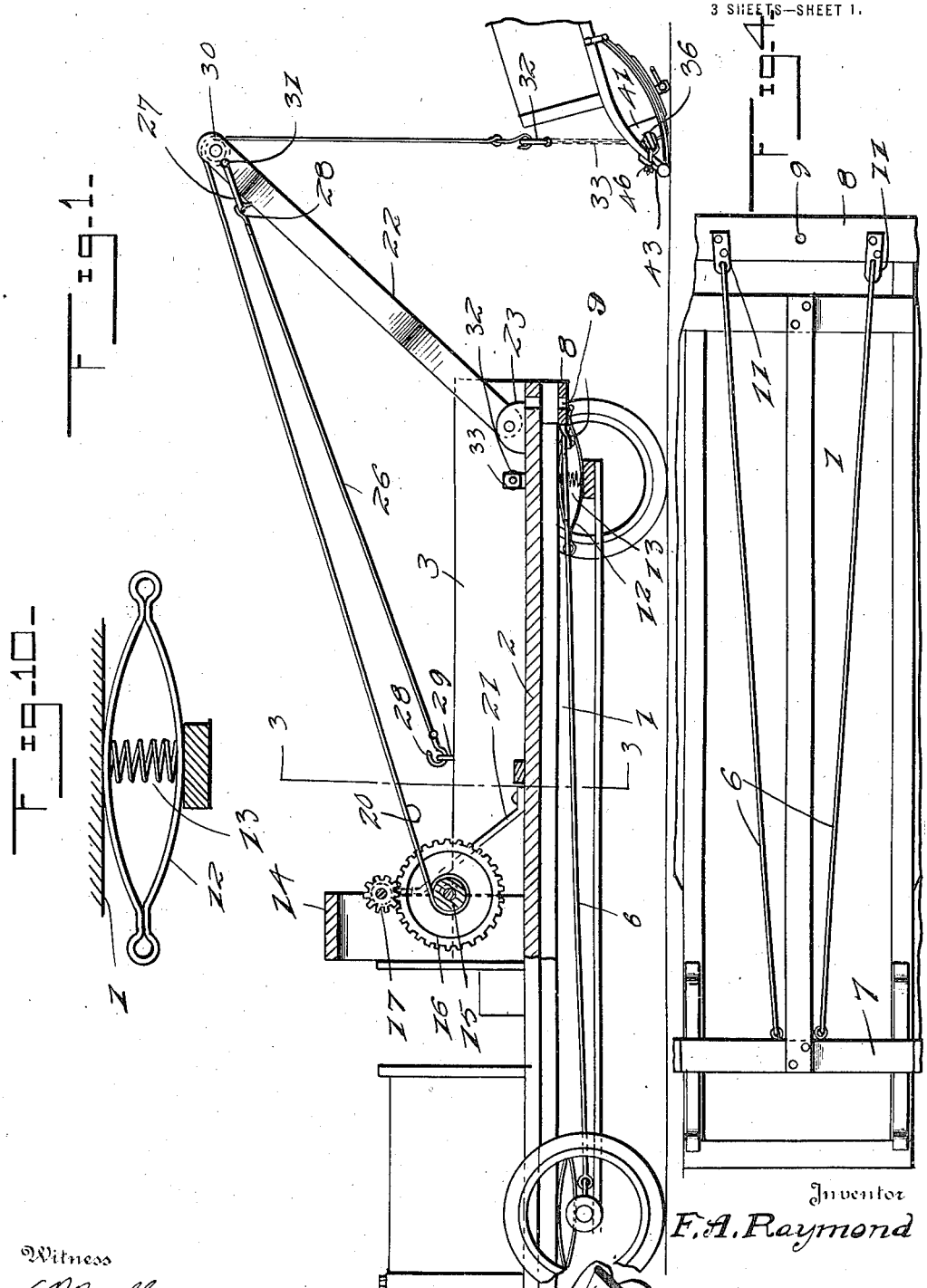
Inventor
F. A. Raymond

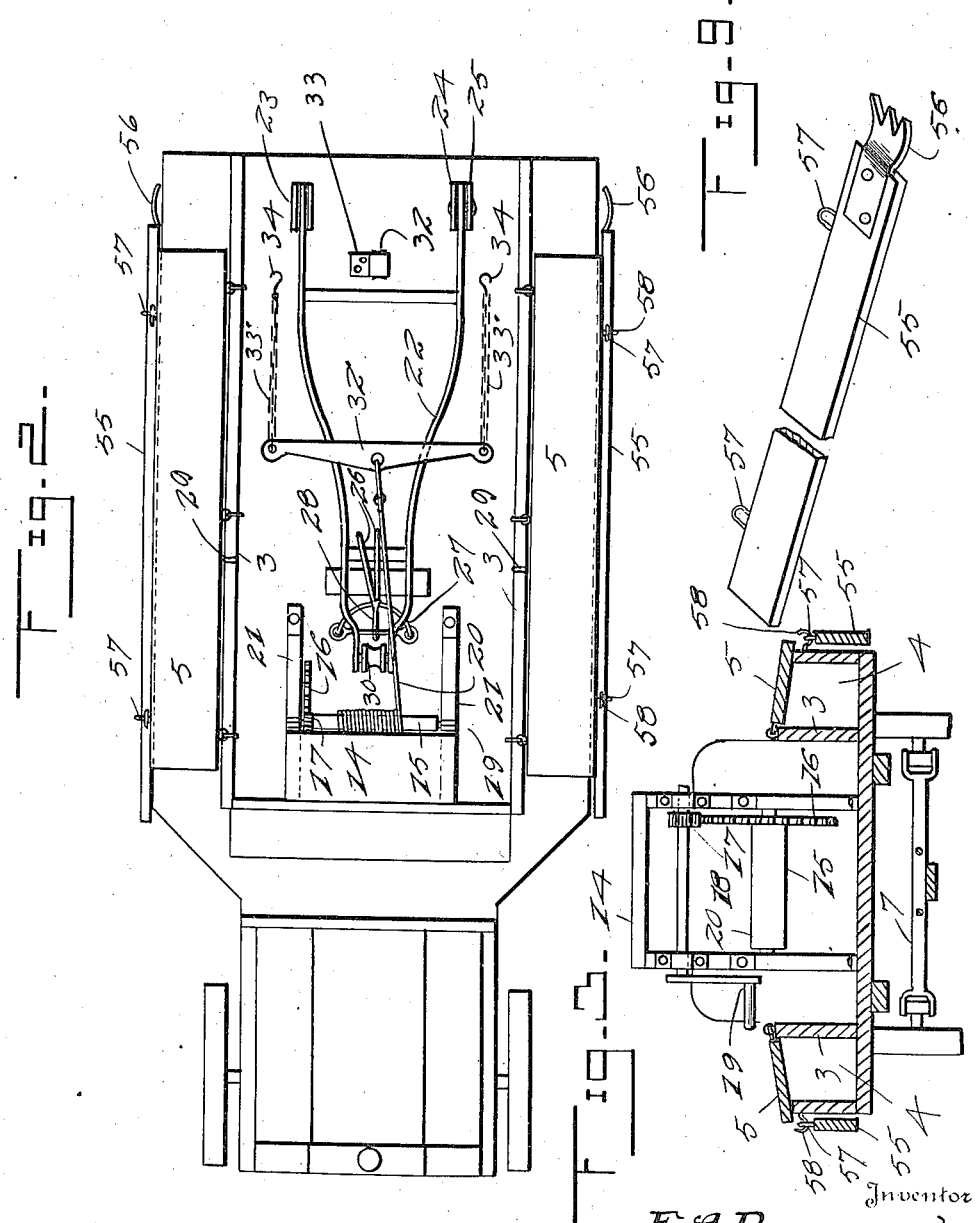

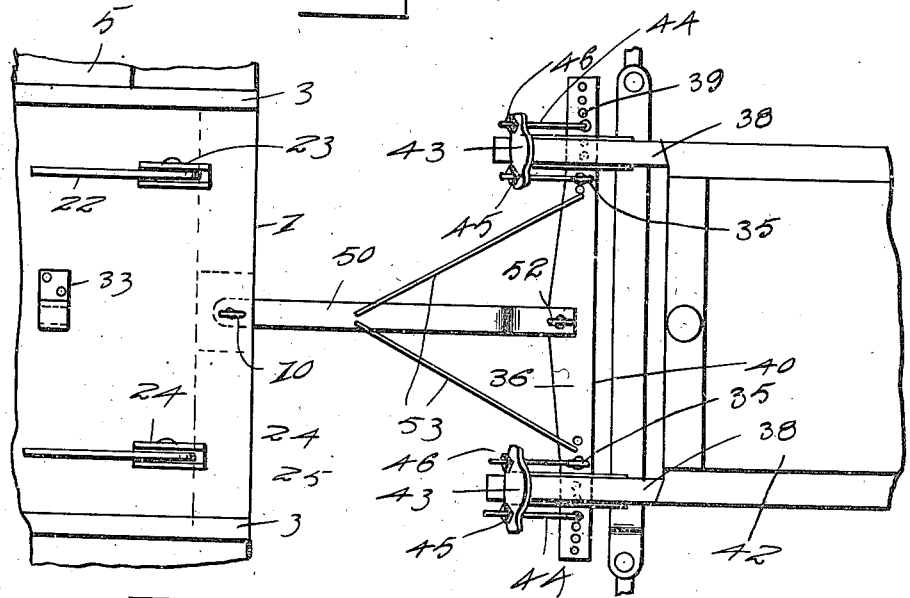
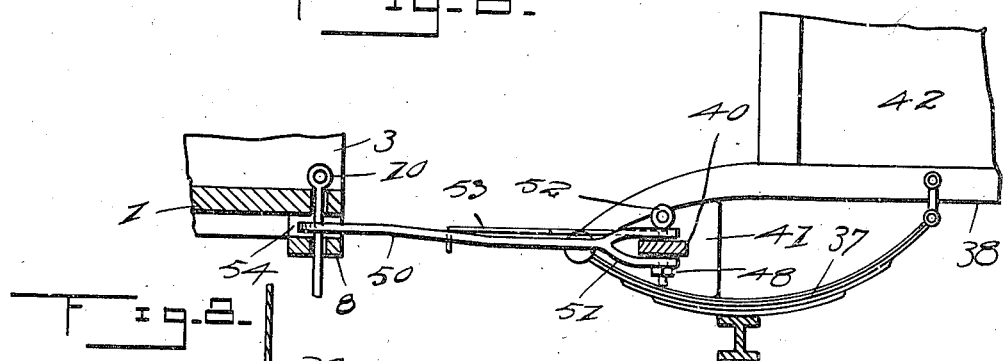
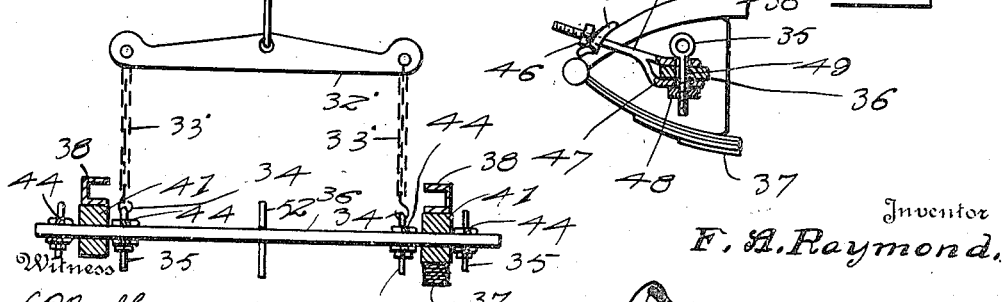

UNITED STATES PATENT OFFICE.

FREDDIE A. RAYMOND, OF SPOKANE, WASHINGTON.

AUTOMOBILE WRECKING-TRUCK.

1,300,649.          Specification of Letters Patent.     Patented Apr. 15, 1919.

Application filed August 15, 1916. Serial No. 115,108.

*To all whom it may concern:*

Be it known that I, FREDDIE A. RAYMOND, a citizen of the United States, residing at Spokane, in the county of Spokane and State of Washington, have invented certain new and useful Improvements in Automobile Wrecking-Trucks; and I do hereby declare the following to be a full, clear, and exact description of the invention, such as will enable others skilled in the art to which it appertains to make and use the same.

The invention relates to an automobile wrecking truck.

The object of the present invention is to provide a simple, practical and efficient automobile repair and wrecking truck of simple and comparatively inexpensive construction equipped with means for handling a wrecked or damaged automobile and capable of enabling the same to be readily lifted from a ditch and to be easily hauled or transported.

It is also the object of the invention to provide an automobile wrecking truck of this character provided with means for enabling an automobile to be readily drawn up a pair of skids and loaded on to the truck should it be necessary to carry the automobile bodily.

With these and other objects in view, the invention consists in the construction and novel combination of parts hereinafter fully described, illustrated in the accompanying drawings and pointed out in the claim hereto appended; it being understood that various changes in the form, proportion, size and minor details of construction, within the scope of the claim, may be resorted to without departing from the spirit or sacrificing any of the advantages of the invention.

In the drawings

Figure 1 is a longitudinal sectional view of an automobile wrecking truck constructed in accordance with this invention and shown arranged for lifting an automobile preparatory to hauling the same, Fig. 2 is a plan view of the hinged crane folded against the bottom of the body, Fig. 3 is a transverse sectional view on the line 3—3 of Fig. 1, Fig. 4 is a bottom plan view of the body of the truck, illustrating the arrangement of the draft rod, Fig. 5 is a plan view illustrating the construction for connecting a damaged automobile with the repair truck for hauling the former, Fig. 6 is a longitudinal sectional view of the same, Fig. 7 is a detail view illustating the construction of the spring blocks and the clamps, Fig. 8 is a detail view illustrating the construction for connecting the hoisting rope or cable with the transverse bar of the draft device, Fig. 9 is a detail view of one of the skids.

Fig. 10 is a detail view illustrating the construction of the rear spring.

In the accompanying drawings in which is illustrated the preferred embodiment of the invention, the wrecking truck comprises in its construction, a frame or body 1 having a bottom 2 and sides 3 spaced from the side edges of the bottom 2 as illustrated in Fig. 3 of the drawings. The body is provided exteriorly of the sides 3 with longitudinally extending tool boxes 4 having hinged lids 5. The truck is designed to be provided with longitudinal draft rods 6 arranged at an inclination and extending upwardly and rearwardly from the body portion of the front axle 7 to a rear transverse bar or member 8 to strengthen and stiffen the construction and enable the repair truck to be readily employed for hauling an automobile without straining or otherwise injuring the truck. The rear transverse bar or member 8 is provided with a central opening 9 for the reception of a coupling pin 10. The rear ends of the said draft rods are connected with the bar or member 8 by suitable clips or clevises 11 but any other suitable means may of course be employed for this purpose. The rear elliptic springs 12 are preferably provided with coiled springs 13 for reinforcing and supporting the same to enable the truck to be utilized for carrying an automobile without straining the springs 12.

The combined repair and wrecking truck is provided at the front portion of the body with a windlass comprising a frame 14, a drum 15 journaled in suitable bearings of the sides of the frame and connected by gears 16 and 17 with an operating shaft 18, provided at one end with a crank handle 19 and adapted to be rotated for winding a wire rope or cable 20 around the drum. Any suitable means may be employed for locking the drum against rotary movement when desired and the gearing may be varied to enable the desired power to be obtained for handling various types and sizes of automobiles. The frame 14 of the windlass is suitably secured to the body of the wrecking truck and it is preferably reinforced by braces 21 secured to the sides of the frame and to the bottom of the body and arranged at an inclination as clearly illustrated in Fig. 1 of the drawings.

The automobile wrecking truck is equipped at the rear end of its frame or body with a crane or crane member 22 adapted to be arranged at an inclined position so as to extend upwardly and project rearwardly beyond the truck as illustrated in Fig. 1 of the drawings and capable also of being folded down upon the bottom of the frame or body as shown in Fig. 2 of the drawings to dispose of the parts compactly when the same are not in use. The crane or crane member which is composed of spaced sides and suitable transverse connecting bars, may be constructed of any suitable material. The lower ends of the crane are pivoted by suitable pivots or pins 23 between ears 24 of irons 25 suitably secured to the bottom of the body or frame of the automobile wrecking truck. The crane member 22 is supported in an inclined position by guy wires 26 connected at their upper ends to a bail 27 of the crane member and provided at their lower ends with hooks 28 adapted to engage eyes 29 mounted upon the frame or body of the truck and preferably located at opposite sides thereof as shown in Fig. 2 but they may be arranged at any other desired point and any desired number may be employed for affording an adjustment of the hinged or pivoted crane member 22 should it be desired to vary the angle or inclination thereof. The bail 27 is spaced from the upper ends of the sides of the crane member to provide a space for a pulley 30. The terminals of the bail 27 are preferably arranged at the outer faces of the sides of the crane member 22 and they are secured to the same by a transverse pivot 31. The wire rope or cable of the windlass may extend from the windlass drum directly to the overhead pulley 30 or it can be arranged beneath a pulley 32 of a snatch block 33 mounted on the floor or bottom of the body of the automobile wrecking truck centrally of the space between the irons 25 to which the lower ends of the sides of the crane member are pivoted. The wire rope or cable 65 is equipped with a transverse connecting or coupling bar 32' centrally secured to the outer end of the wire rope or cable and provided at its terminal with chains 33'. Hooks 34 are carried by the terminals of the chains 33' to enable them to be readily placed around an axle or other portion of an automobile and also to permit them to be engaged with eye-bolts 35 of a transverse bar 36 of a draft attachment for connecting the automobile repair or wrecking truck with the projecting portions of the front springs of an automobile as clearly illustrated in Figs. 5 to 8 inclusive. The draft device is adapted to connect the crane with the front portion of an automobile to enable the same to be lifted from a position such as is indicated in Fig. 1 of the drawings to a proper horizontal position so that such automobile may be coupled to the wrecking truck and drawn to a repair shop or other place. The crane is adapted to enable the wrecked automobile to be lifted from a ditch or the like and also to be supported in an elevated position for repair or for otherwise handling an automobile. The transverse bar of the draft device extends through the space between the springs 37 and the frame members 38 of the chassis of an automobile and has its terminal portions 39 extending through openings 40 of tapering spring blocks 41 preferably constructed of wood and conforming to the configuration of the said space between the springs 37 and bars or members 38. The terminal portions 39 permit an adjustment of the spring blocks to enable the draft attachment to be applied to automobiles of different widths. The transverse bar 36 and the blocks 41 are secured to the automobile 42 by means of clamps composed of plates 43 and rods or bolts 44 having threaded outer portions extending through perforations 45 of the said plates 43 and provided with nuts 46 to enable the plates to be readily adjusted to suit the frame members or springs of the automobile to which the draft attachment is applied. The rods or bolts 44 are provided with inner bifurcated or forked portions 47 having perforations 48 adapted to register with perforations 49 of the terminal portions 39 of the transverse bar 36, to receive the eye-bolts 35.

The transverse bar 36 is centrally connected to the rear end of a draw bar 50 provided with a forked or bifurcated rear portion 51 which is secured to the said transverse bar 36 of the draft device by a coupling pin or bolt 52. The draw bar 50 is preferably braced by rearwardly diverging rods 53 connected at their front terminals to the draw bar at a point intermediate of the ends thereof and suitably secured at their rear terminals to the transverse bar 36 at opposite sides of the center of the same. The bracing rods 53 are adapted to prevent the towed automobile from swaying through pivotal movement of the draw bar 50 independent of the transverse bar 36. The front end of the draw bar is pivoted in an opening 54 of the rear transverse bar 8 by the coupling pin 10.

The automobile repair and wrecking truck is equipped with a pair of skids or skid boards 55 provided at one end with projecting claws 56 to prevent them from slipping and adapted to enable an automobile to be readily drawn onto the wrecking truck should the same be necessary or desirable. The skid boards 55 are provided at spaced points with eyes 57 to enable them to be readily hung on hooks 58 projecting from the exterior of the front walls of the tool boxes 4. This will enable a pair of skid boards to be easily and conveniently carried in position for instant use.

It will be seen that the automobile wrecking truck is adapted to either carry or tow an injured automobile as occasion may require and that injured automobiles may be readily lifted from ditches or otherwise handled either for repairing them at the point where the wreck occurred or for transporting them to a shop or other place for repair.

What is claimed is:—

An automobile wrecking truck of the class described including a body, a transverse bar provided with means for securing it to the front portion of an automobile, means for connecting the transverse bar with the truck, a windlass mounted on the truck and provided with a rope or cable, means for connecting the rope or cable with the transverse bar at opposite sides of the center thereof, and a foldable crane member provided with a pulley to receive the said rope or cable whereby the latter may be arranged for lifting an automobile, said rope or cable being also adapted to draw the automobile forwardly when the crane member is folded.

In testimony whereof I affix my signature in presence of two witnesses.

FREDDIE A. RAYMOND.

Witnesses:
E. W. FAIRBURN,
S. H. JONES.